United States Patent [19]

Owades et al.

[11] Patent Number: 5,415,885
[45] Date of Patent: May 16, 1995

[54] PRODUCT AND PROCESS OF MAKING A NUTRITIOUS MALT CONTAINING SOFT DRINK

[75] Inventors: Joseph L. Owades, Sonoma; Kimberly D. LaBrie, San Francisco, both of Calif.; David H. Gleeson, Pennington, N.J.

[73] Assignee: The Sweetenbetter Company

[21] Appl. No.: 217,942

[22] Filed: Mar. 25, 1994

[51] Int. Cl.⁶ .................. A23L 1/185; A23L 2/38; A23L 2/60

[52] U.S. Cl. .................. 426/590; 426/16; 426/29; 426/311; 426/648; 426/661

[58] Field of Search .................. 426/72, 73, 311, 648, 426/661, 16, 29, 590

[56] References Cited

U.S. PATENT DOCUMENTS

| | | | |
|---|---|---|---|
| 960,841 | 6/1910 | Defren | 426/590 |
| 1,631,830 | 6/1927 | Negley et al. | 426/590 |
| 3,113,029 | 12/1963 | Hernandez | 99/78 |
| 4,666,718 | 5/1987 | Lowery et al. | 426/13 |
| 4,737,368 | 4/1988 | Batterman et al. | 426/590 |
| 4,765,993 | 8/1988 | Owades | 426/64 |
| 4,957,767 | 9/1990 | De Kort et al. | 426/590 |
| 5,120,557 | 6/1992 | Owades | 426/330.3 |

*Primary Examiner*—Helen Pratt
*Attorney, Agent, or Firm*—Hayes, Soloway, Hennessey, Grossman & Hage

[57] ABSTRACT

A sweet soft drink having the same °Brix as a conventional soft drink but with enhanced nutrition is provided. The beverage comprises a malt-extract containing aqueous solution to which is added a quantity of "sweet sugars". The malt extract and "sweet sugars" synergistically produces a beverage having increased apparent sweetness substantially greater than the sweetness contributed by the "sweet sugars" and the malt extract by themselves, and having enhanced nutritional value.

15 Claims, No Drawings

PRODUCT AND PROCESS OF MAKING A NUTRITIOUS MALT CONTAINING SOFT DRINK

FIELD OF THE INVENTION

This invention relates to new soft drinks and to method of producing the same. More particularly, the invention employs an aqueous extract of barley malt to replace a portion, e.g. about half, of the sugar solids in a soft drink, whereby to produce a nutritious soft drink characterized by a sweetness traditionally associated with conventional soft drinks, but containing significantly less than the about 9–12% sugar, invert syrup and/or high fructose corn syrup (so called "sweet sugars"), currently typically employed in soft drinks.

DESCRIPTION OF THE PRIOR ART

Currently, soft drinks are made by flavoring, acidifying, and optionally carbonating solutions of sugar, invert syrup and/or high fructose corn syrup at concentrations of about 9° Brix to about 12° Brix or slightly higher, most usually at about 11° Brix. These beverages typically supply only calories, so-called "naked calories", since they do not provide any of the other factors which allow their carbohydrates to be metabolized. These factors must come from other sources.

Barley malt is a highly nutritious substance. Aqueous extracts of barley malt, called "wort" now made primarily to be fermented into beer, contain all the essential vitamins in the B family (niacin, riboflavin, pantothenic acid, thiamin, nicotinic acid, Vitamin B6 (pyridoxine), biotin, and folic acid); plus amino acids and protein, minerals, (such as calcium, magnesium, potassium and zinc), and soluble fiber (glucans). Thus, beverages made using barley malt are attractive from a nutrition standpoint.

Aqueous extracts of barley malt, besides their use as a substrate for yeast in the production of beer, have been used in some non-alcoholic brews, and in a beverage called "Malta". However, in the production of non-alcoholic brews, the malt extract is processed so as to avoid apparent sweetness, in order better to simulate a fermented beer.

In "Malta", which arose historically as a means of utilizing molasses from sugar cane operations in a potable beverage, the relatively low sweetness of malt extracts is compensated for by using high levels of either molasses or "sweet sugars", and flavoring with caramelized malt or caramel itself. A typical "Malta" has a Brix reading of about 13° to about 15°, is very dark in color, is strongly flavored, and has a relatively high caloric content due to the high levels of molasses or "sweet sugars" present therein.

Owades, in U.S. Pat. No. 4,765,993 teaches hydrolyzing the dextrins and maltose in "Malta" to a multiplicity of glucose molecules by an amylolytic enzyme. These additional glucose molecules reportedly increase the sweetness, and permit the addition of water to give equivalent sweetness and flavor intensity traditionally associated with a conventional Malta beverage, but having a reduced caloric content.

Hernandez U.S. Pat. No. 3,113,029 teaches the preparation of a malt extract, a so-called "beer concentrate", and mixing the extract with an edible acid, a thickener and sodium chloride to make either a beer or a malt beverage. There is no disclosure or suggestion in Hernandez that sweetness is an object, or achieved.

Owades, in U.S. Pat. No. 5,120,557, teaches the use of spent hopes (that is, hops from which the alpha-acids, or bittering components, have been extracted) in an unfermented malt beverage to improve the flavor of the beverage by removing or masking, the grainy flavors normally present. As in Hernandez, there is no disclosure or suggestion that sweetness is an object, or achieved.

Lowery et al, in U.S. Pat. No. 4,666,718, teaches that a glucamylase enzyme from *Schwanniomyces castellii* produces glucose from the dextrins in wort, and then ferments this glucose to alcohol. As in Hernandez and Owades, there is no disclosure or suggestion that sweetness is an object, or achieved.

OBJECT OF THE INVENTION

The primary object of the present invention is to provide a means of producing a highly nutritious soft drink with the same °Brix as a conventional soft drink but with enhanced nutrition, and reduced "sweet sugars" content.

BRIEF DESCRIPTION OF THE INVENTION

It has been found that the addition of "sweet sugars" to an essentially caramel-free malt extract-containing beverage synergistically increases the apparent sweetness of the less sweet maltose to that of "sweet sugars". As used herein the term "essentially caramel-free" means that the level of caramel or caramelized malt is below that sufficient to raise the color of the beverage by about 5° Lovibond. More particularly, the addition of from only about 2° Brix to about 8° Brix of sucrose, invert syrup and/or high fructose corn syrups, preferably either the 42 or the 52 type, so-called "sweet sugars", to an essentially caramel-free malt extract-containing beverage, unexpectedly produces a beverage having an apparent sweetness of an all "sweet sugars" beverage. By way of example, an essentially caramel-free malt extract-containing beverage of about 5.5° Brix of malt extract and about 5.5° Brix all "sweet sugars" has the perceived sweetness of an about 11° Brix all "sweet sugars" beverage. The preferred range of addition of "sweet sugars" is about 2° Brix to about 8° Brix. Addition of "sweet sugars" in an amount below about 2° Brix, while producing a beverage which is sweeter than the starting malt extract-containing beverage, generally is not considered to be sufficiently sweet to satisfy consumer tastes for conventional all "sweet sugar" beverages, which typically have a sweetness about 11° Brix. On the other hand, addition of more than about 8° Brix of "sweet sugars" to an essentially caramel-free malt extract-containing beverage produces a beverage which is considered to be too sweet by most consumers. The synergistic sweetening effect of the addition of about 2° Brix to about 8° Brix of "sweet sugars" to an essentially caramel-free malt extract-containing beverage is unexpected. Malt extract typically contains about 90% maltose, about 8% glucose and only about 2% of fructose and sucrose, with the maltose and glucose each having a relative sweetness of about 0.6, with sucrose taken as 1.0. (International Critical Tables, Vol. I, 1926). Thus, when measured on an equal °Brix basis, the addition of the "sweet sugars" has the synergistic effect of increasing the apparent sweetness of the malt extract by about 40%. This synergism does not occur in the presence of caramel malt or caramel found in Malta.

DETAILED DESCRIPTION OF THE INVENTION

The malt extract may be produced by any conventional means in a typical brewery brewhouse. Typically, a quantity of barley malt is ground, and the ground malt extracted with warm water. The resulting mash is then strained or filtered to remove insoluble components and yield clear wort. The resulting clear wort is boiled with spent hops, cooled and filtered. Depending on the dextrin content desired, the mashing may be conducted rapidly in a single stage, or over an extended enzymatic conversion period, in two or more stages.

The resulting wort is diluted with water, and the product is sweetened by the addition of a "sweet sugar", acidified and flavored, and if desired, carbonated.

The present invention will be further described in the following working examples. In Example I, the malt wort is processed with lengthy enzymatic conversion periods to produce a relatively low proportion (10 to 25 solids weight percent) of dextrins, and is preferred for producing a beverage for consumers desiring a rapid source of energy. In Example II, the malt wort is processed to produce a relatively high proportion (30 to 50 solids weight percent) of dextrins (complex polysaccharides) for providing a slow-release of energy, e.g., for strenuous athletes.

EXAMPLE I 2,000 lbs. of ground barley malt are mixed with 20 bbls. of water at 120° F. and allowed to rest for 20 minutes.

The temperature is raised to 145° F. and held there for 45 minutes. The temperature is raised to 163° F. and held there for 30 minutes. The temperature is raised to 167° F. and the mash is filtered.

The clear wort is boiled for 60 minutes with 20 lbs. of spent hops, cooled and filtered. The resulting solution is diluted to 5.5° Brix with water, and contains a relatively low proportion (20 solids weight percent) of dextrins.

To 33 bbls. of 5.5° Brix wort is added 63 gal. of 77° Brix high fructose corn syrup 55 to give a liquid with 11° Brix.

The pH was lowered to 3.0 with phosphoric acid, and the resulting liquid was carbonated.

A panel of nine judges tasted the resulting beverage in a blind triangular test for sweetness with a carbonated solution of 11° Brix of high fructose corn syrup 55, pH adjusted to 3.0 with phosphoric acid. Only three tasters picked the correct odd sample. This is not significant and indicates no difference in sweetness between the all "sweet sugar" solution and the one that was half malt wort and half high fructose corn syrup.

EXAMPLE II 5,000 lbs. of ground barley malt are added to 50 bbls. of water at 120° F. The mixture is allowed to rest for 15 minutes, and then the temperature is raised to 167° F. as quickly as possible. The solution is held at 167° F. for 10 minutes, and then filtered and treated as in Example I. This wort contains a relatively high proportion (45 solids weight percent) of dextrins.

The cooled and filtered solution is diluted to 5° Brix. Fifty (50) bbls. of this solution are treated with high fructose corn syrup to give a density of 11° Brix, and the pH lowered to 3.0 with phosphoric acid, and the resulting liquid was carbonated as in Example I.

The sweetness was tested using a panel of nine judges in a blind triangular test for sweetness, and was judged to be equivalent to a standard soft drink in sweetness.

As appears clearly from the foregoing, the addition of a reduced amount of "sweet sugars" to an essentially caramel-free malt extract-containing beverage produces a beverage with a sweetness of a conventional high "sweet sugar" beverage containing only "sweet sugars".

Since certain changes may be made in the above process and products without departing from the scope of the invention herein involved, it is intended that all matter contained in the above description shall be interpreted in an illustrative and not in a limiting sense.

We claim:

1. A malt extract containing beverage comprising malt, and about 2° Brix to about 8° Brix of "sweet sugars", said beverage being essentially caramel malt-free and characterized by having a perceived sweetness of an all "sweet sugars" containing beverage, but having a reduced "sweet sugars" content, and enhanced nutritional value.

2. A beverage according to claim 1, wherein said "sweet sugars" are selected from the group consisting of sucrose, invert syrup, high fructose corn syrup and mixtures thereof.

3. A beverage according to claim 1, comprising about 5.5° Brix of malt extract and about 5.5° Brix of "sweet sugars, and having an apparent sweetness of about 11° Brix.

4. A beverage according to claim 1, wherein said malt extract comprises 10 to 25 solids weight percent of dextrins.

5. In a beverage according to claim 1, wherein said malt extract comprises 30 to 50 solids weight percent of dextrins.

6. A beverage according to claim 1, wherein said beverage is flavored.

7. A beverage according to claim 1, wherein said beverage is carbonated.

8. A beverage according to claim 1, wherein said beverage is acidified.

9. A beverage according to claim 1, characterized by having a perceived sweetness of about 11° Brix.

10. A method of producing a malt extract containing soft drink which comprises adding to an essentially caramel malt-free malt extract-containing beverage about 2° Brix to about 8° Brix of "sweet sugars" whereby to produce a beverage having the perceived sweetness of an all "sweet sugars" containing beverage, but having a reduced "sweet sugars" content, and enhanced nutritional value.

11. A method according to claim 10, wherein said "sweet sugars" are selected from the group consisting of sucrose, invert syrup, high fructose, corn syrup and mixtures thereof.

12. A method according to claim 10, and including the step of adding a flavor to said beverage.

13. A method according to claim 10, and including the step of acidifying the beverage.

14. A method according to claim 10, and including the step of carbonating the beverage.

15. A method according to claim 10, wherein said beverage has a perceived sweetness of about 11° Brix.

* * * * *